United States Patent
Moore et al.

(10) Patent No.: US 11,314,639 B2
(45) Date of Patent: *Apr. 26, 2022

(54) PROTECTING AGAINST DATA LOSS DURING GARBAGE COLLECTION

(71) Applicant: INTERNATIONAL BUSINESS MACHINES CORPORATION, Armonk, NY (US)

(72) Inventors: Roderick Guy Charles Moore, Bournemouth (GB); Miles Mulholland, Eastleigh (GB); William John Passingham, Botley (GB); Richard Alan Bordoli, Hampshire (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 54 days.

This patent is subject to a terminal disclaimer.

(21) Appl. No.: 17/092,512

(22) Filed: Nov. 9, 2020

(65) Prior Publication Data

US 2021/0103521 A1    Apr. 8, 2021

Related U.S. Application Data

(63) Continuation of application No. 16/595,840, filed on Oct. 8, 2019, now Pat. No. 10,929,288.

(51) Int. Cl.
*G06F 12/02* (2006.01)
*G06F 12/0804* (2016.01)
*G06F 12/10* (2016.01)

(52) U.S. Cl.
CPC ...... *G06F 12/0253* (2013.01); *G06F 12/0804* (2013.01); *G06F 12/10* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

2013/0311741 A1    11/2013    Gil
2014/0059093 A1    2/2014    Sekiguchi
(Continued)

FOREIGN PATENT DOCUMENTS

CN    108701082 A    10/2018

OTHER PUBLICATIONS

Notification of Transmittal of the International Search Report and Written Opinion of the International Searching Authority, or the Declaration, International application No. PCT/IB2020/059142, Applicant's or agent's file reference P201901206, dated Jan. 15, 2021.

(Continued)

*Primary Examiner* — Prasith Thammavong
*Assistant Examiner* — Edmund H Kwong
(74) *Attorney, Agent, or Firm* — Anthony Curro

(57) ABSTRACT

Garbage collection is performed for a virtualized storage system whose virtual address space is addressed in extents. Valid data in source extents is copied via a cache into destination extents. Once all valid data in a source extent is copied into one or more destination extents, the source extent may be reused. A source extent is released for reuse only after the one or more destination extents that received the valid data copied from the source extent are determined to be full, and the valid data copied from the source extent to the destination extent via the cache is flushed out of the cache.

24 Claims, 8 Drawing Sheets

(56) References Cited

U.S. PATENT DOCUMENTS

| | | | |
|---|---|---|---|
| 2015/0212938 A1* | 7/2015 | Chen | G06F 3/0685 |
| | | | 711/166 |
| 2016/0041902 A1 | 2/2016 | Atkisson | |
| 2017/0277726 A1 | 9/2017 | Huang | |
| 2018/0210667 A1 | 7/2018 | Matsumura | |
| 2018/0373444 A1 | 12/2018 | Mulholland | |
| 2019/0042442 A1 | 2/2019 | Hutchison | |
| 2019/0266100 A1 | 8/2019 | Mello | |
| 2020/0133511 A1* | 4/2020 | McGrath | G06F 12/0246 |

OTHER PUBLICATIONS

IBM, List of IBM Patents or Patent Applications Treated as Related, Appendix P, dated Nov. 12, 2020, 2 pages.

Pending U.S. Appl. No. 16/595,840, entitled "Protecting Against Data Loss During Garbage Collection", 55 pages.

Mell et al., "The NIST Definition of Cloud Computing", National Institute of Standards and Technology, Special Publication 800-145, Sep. 2011, pp. 1-7.

Pending U.S. Appl. No. 16/548,474, filed Aug. 22, 2019, entitled "Data Validation During Data Recovery in a Log-Structured Array Storage System", pp. 1-47.

Pending U.S. Appl. No. 16/595,840, filed Oct. 8, 2019, entitled, "Protecting Against Data Loss During Garbage Collection", pp. 1-55.

Shen et al., "DIDACache: A Deep Integration of Device and Application for Flash Based Key-Value Caching", This paper is included in the Proceedings of the 15th USENIX Conference on File and Storage Technologies (FAST '17)., Feb. 27-Mar. 2, 2017, Santa Clara, CA, USA, pp. 1-17.

\* cited by examiner

PROTECTING AGAINST DATA LOSS DURING GARBAGE COLLECTION

FIELD

The present disclosure relates to garbage collection in data storage systems.

BACKGROUND

A popular strategy for performing writes in a data storage system is always to write to fresh data ranges in the data domain. This strategy has the advantage that it is possible to update a RAID (redundant array of independent disk) array without the need to perform any reads from disk.

A typical 'write' will perform the following: an input-output (IO) will be received for a given volume, with an address, a size, and some data. The storage allocator will assign that volume a storage location on the physical domain. The IO path will then write to that location on the physical domain. Once the write has completed, forward and reverse lookup structures are updated, and the IO is completed. As part of the forward lookup update, a journal is also updated.

A typical 'read' will check the forward lookup structure to identify where on the data domain the data is located. The data domain will then be read, and the data there returned to the user.

BRIEF SUMMARY OF THE INVENTION

Various embodiments are directed to a method of garbage collection in a storage system in which a virtual address space is mapped to a physical address space, the virtual address space being addressed in extents and the storage system having one or more processors, a plurality of storage devices, and a cache memory. The method may include selecting a first destination extent as a current destination extent for receiving garbage collected data and selecting a first source extent as a current source extent to be subject to garbage collection, the current source extent containing one or more portions of valid data. The method may also include determining whether a destination extent selected as the current destination extent for receiving garbage collected data is full. The method may include determining whether a source extent selected as the current source extent subject to garbage collection contains one or more portions of valid data not copied to a destination extent. In addition, responsive to determining that the current destination extent for receiving garbage collected data is not full and determining that the current source extent subject to garbage collection contains one or more portions of valid data not copied to a destination extent, the method may include copying one of the portions of valid data not copied to a destination extent from the current source extent to the current destination extent via the cache memory. Further, responsive to determining that the current destination extent for receiving garbage collected data is full, the method may include flushing the valid data copied to the current destination destination extent via the cache memory out of the cache memory. Additionally, subsequent to the flushing the valid data moved to the current destination extent out of the cache memory, the method may include releasing as available for writes to the physical address space mapped to the virtual address space of one or more source extents having all valid data stored therein copied to the current destination extent via the cache memory.

Various embodiments of a method of garbage collection may include: responsive to determining that the current destination extent for receiving garbage collected data is full, selecting a second destination extent as the current destination extent for receiving garbage collected data.

Various embodiments of a method of garbage collection may include: responsive to determining that the second destination extent for receiving garbage collected data is full, flushing the valid data copied to the current destination destination extent via the cache memory out of the cache memory, wherein the flushing of valid data copied to a current destination destination extent via the cache memory out of the cache memory is flushed in a same order as an order in which the destination extents were determined to be full.

Various embodiments of a method of garbage collection may include: responsive to determining that the current source extent subject to garbage collection contains no portions of valid data not copied to a destination extent, selecting a second source extent as the current source extent to be subject to garbage collection.

Various embodiments of a method of garbage collection may include: controlling the release of physical address space after cache flushing of destination extents with the aid of allocating a sequence number to each destination extent, each sequence number allowing a look-up to the source extents whose garbage collection was completed by copying data into that destination extent, the sequence number of the oldest destination extent for which flushing has not been performed being stored as a low watermark sequence number, and the sequence number of the current destination extent allocated for garbage collection from source extents being stored as a high watermark sequence number, wherein the low watermark sequence number is incremented on completion of flushing of the oldest destination extent out of the cache memory, and the high watermark sequence number is incremented on selecting a further destination extent for garbage collection.

Various embodiments of a method of garbage collection may include: wherein, in response to determining that the available virtual address space is less than a threshold: suspending the copying of valid data from source to destination extents; and releasing as available for writes to the physical address space mapped to the virtual address space of at least one destination extent having a sequence number between the low and high watermark values.

Various embodiments of a method of garbage collection may include: maintaining a journal that stores recovery information for destination extents having a sequence number between the low and high watermark values, the recovery information including mappings between source extents whose valid data was subject to garbage collection and corresponding destination extents.

Various embodiments of a method of garbage collection may include: responsive to determining a loss of cache contents during garbage collection, using the recovery information to rebuild a forward lookup metadata structure that links virtual address space to physical address space for the source extents identified in the recovery information.

Various embodiments are directed to a computer program product for garbage collection in a storage system in which a virtual address space is mapped to a physical address space, the virtual address space being addressed in extents and the storage system having one or more processors, a plurality of storage devices, and a cache memory.

Various embodiments are directed to a storage system having a virtual address space that is mapped to a physical address space, the virtual address space being addressed in extents, the storage system having one or more processors, a plurality of storage devices, and a cache memory, the storage system comprising: a storage allocator and a garbage collector.

Various embodiments may protect the data storage system against data loss in respect of garbage collection that was underway at the time of a cache failure. Various embodiments provide a garbage collection algorithm which is coordinated with cache-flush operations relating to garbage collected data. The garbage collection is performed such that old data (i.e. live data stored in cache flushed blocks) is not discarded until the storage allocator is sure that any live data that is being moved from the garbage-collected block has been successfully flushed through the cache to its new physical memory location and has therefore safely arrived at, and been stored in, the destination block for the garbage-collected live data.

It is noted that although the various embodiments have been designed to operate successfully in storage systems that use compression, embodiments may also be used in storage systems that do not use compression. Implementations of the embodiments can be used for any data reduction that writes new data to a new location and relies on garbage collection. For example, uncompressed data could be written as proposed, even though an overwrite in the same place could have worked.

The release of physical address space after cache flushing of destination extents can be controlled in certain embodiments with the aid of allocating a sequence number to each destination extent, each sequence number allowing a look-up to the source extents whose garbage collection was completed by moving data into that destination extent, the sequence number of the oldest destination extent for which flushing is not complete being stored as a low watermark sequence number, and the sequence number of the destination extent currently allocated for garbage collection from source extents being stored as a high watermark sequence number, wherein the low watermark sequence number is incremented on completion of flushing of the oldest destination extent out of the cache memory, and the high watermark sequence number is incremented on selecting a further destination extent for garbage collection. If the available virtual address space is determined to have become scarce, this can be managed by: suspending the moving of valid data from source to destination extents; and releasing as available for writes the physical address space mapped to the virtual address space of the destination extents with sequence numbers between the low and high watermark values.

For recovery, e.g. from a spontaneous cache contents loss or corruption, it is beneficial to maintain a journal that stores recovery information for each sequence number between the low watermark sequence number and the high watermark sequence number, the recovery information including for each sequence number a mapping to the source extents whose garbage collection was completed by moving data into the destination extent associated with that sequence number. In the event of cache contents loss during garbage collection, the recovery information can be used to rebuild a forward lookup metadata structure that links virtual address space to physical address space for the source extents identified in the recovery information.

The method and storage system are particularly suited to, but not limited to, use in conjunction with an operating system in which each write is performed to a fresh extent. The method and storage system are particularly suited to, but not limited to, use with an operating system in which data is stored in compressed form.

In summary, various embodiments provide a garbage collection method for virtualized storage systems whose virtual address space is addressed in blocks called extents. Old extents are garbage collected by transferring their still-valid data into fresh extents, referred to as destination extents. The garbage collected extents can then be released for reuse with new writes. To take account of the possibility of cache loss while the garbage collected data is still in the process of being written to physical memory, the garbage collected extents are initially withheld from release after their garbage collection. Once a destination extent receiving garbage collected data is full, a cache flush of that destination extent is initiated. The memory space of the garbage collected extents associated with that destination extent is then released on completion of the cache flush.

BRIEF DESCRIPTION OF THE DRAWINGS

In the following, the present invention will further be described by way of example only with reference to exemplary embodiments illustrated in the figures.

DETAILED DESCRIPTION

Figure 1:
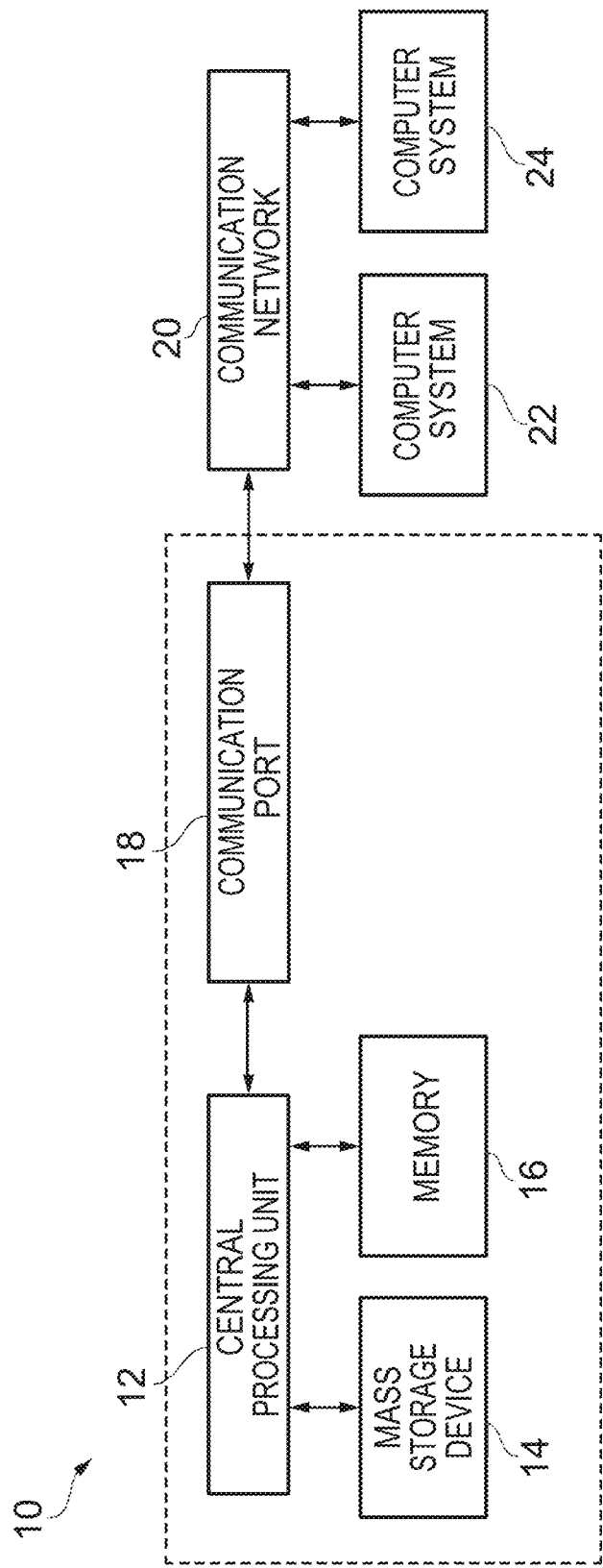
FIG. 1 shows a computer system environment with a mass storage device.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

As mentioned, a popular strategy for performing writes in a data storage system is always to write to fresh data ranges in the data domain. This strategy has the advantage that it is possible to update a RAID (redundant array of independent disk) array without the need to perform any reads from disk. However, a consequence of always performing a write to a fresh data range is that a lot of memory space is allocated, which then has to be reclaimed by garbage collection. Indeed, if data compression is used, which is an option in some operating systems, such as IBM z/OS, the size of writes will inevitably vary, since the size will depend on the compressibility of the data. For example, one write may take 8K worth of space, whereas another only 1K. It is therefore not possible consistently to overwrite data that is in place, since it cannot be guaranteed that the overwritten data will fit into the old memory location when compression is used, so writes must always be performed to fresh data ranges.

Garbage collection reclaims old data ranges that have become dominated by stale data as a result of overwrites and so contain only sparse amounts of live data. Garbage collection proceeds by salvaging the remaining live data and writing it in a contiguous block to a fresh data range. When data is overwritten, it is said to be invalidated. Garbage collection will take a region with invalidated data on the data domain, move the live data out of it and write it to new locations on the data domain; updating the forward lookup metadata in the process. Forward lookup metadata may be implemented as a tree, most commonly a b-tree. The forward b-tree structure maps virtual memory addresses to physical memory addresses in a virtual storage system. Reverse lookup metadata describes which volumes reference a given range of the physical domain and hence documents what data subranges are and are not allocated on the physical domain. The reverse lookup structure is thus required by the garbage collection algorithm.

A journal is maintained which can be used to rebuild the forward lookup metadata structures in the event of a cache failure. Cache failures generally precipitate the loss of many gigabytes of live data. Journaling ensures every update to the forward lookup metadata is documented in a sequential log. This log can be replayed to rebuild the forward lookup metadata. Integrating periodic copying (sometimes referred to as snapshotting) of the forward lookup metadata into this scheme removes the need for a potentially ever-growing journal size, since the journal then only needs to track forward lookup updates since the last snapshot. In the case of the forward lookup metadata having a tree structure, such as a b-tree, the periodic copying is sometimes referred to as tree snapshotting. It is noted that the data itself that the journal is referencing is typically not journaled, due to the prohibitive write bandwidth cost of doing so. The approach of journaling the forward lookup metadata (e.g. b-tree updates) requires far less bandwidth. Journaling and the updating of the lookup structures may be performed by various modules or components in different embodiments. In various embodiments, journaling and the updating of the lookup structures may be performed by the storage allocator of by the garbage collector.

A typical 'write' will perform the following: an input-output (IO) will be received for a given volume, with an address, a size, and some data. The storage allocator will assign that volume a storage location on the physical domain. The IO path will then write to that location on the physical domain. Once the write has completed, the forward and reverse lookup structures are updated, and the IO is completed. As part of the forward lookup update, the journal is also updated.

A typical 'read' will check the forward lookup structure to identify where on the data domain the data is located. The data domain will then be read, and the data there returned to the user.

In the event of a system failure, it is possible for cache contents to be lost: if the cache exists below the component that implements data reduction technologies, in-flight data can be lost. (Data in flight is any data yet to be completely written to media and so potentially lost if cache is discarded.) This is a common failure pattern in storage systems, and to a degree can be acceptable—or at least expected. This is the performance trade off one makes when using such a cache.

In storage system with fixed physical domain locations for updates, or thick volumes, the loss of cache can be tolerated, since the outcome is merely that old data is returned, in the case that updates were pending in the cache at the point of failure. However, with data reduction volumes, it may not be possible to consistently write to the same location during overwrites, which means that data that was being garbage collected at the time of the failure can also be lost, so this part of the old data is not returned. In file systems, returning stale data is often preferable to returning medium errors (i.e. loss of data).

FIG. 1 illustrates an example computer system 10. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Garbage collection operations may be executed on device(s) 14, located in system 10 or elsewhere. Memory device 16 may include such memory as electrically erasable programmable read only memory (EEPROM) or a host of related devices, e.g., RAM, ROM, FLASH, etc. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform garbage collection and other operations as described herein.

Figure 2:
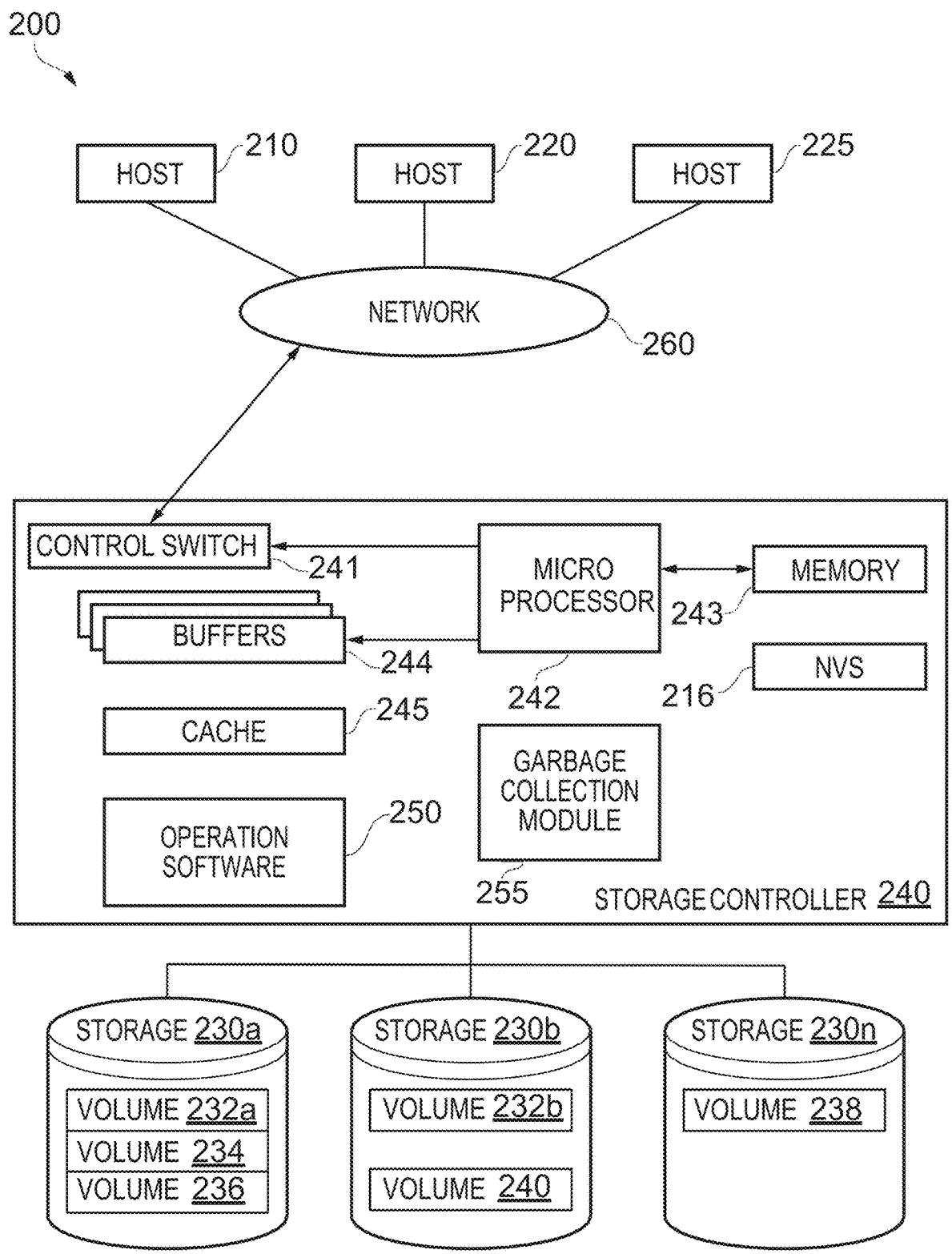
FIG. 2 is a block diagram showing the hardware structure of a data storage system.

FIG. 2 is an exemplary block diagram 200 showing a hardware structure of a data storage system in a computer system for implementing embodiments of the invention. Host computers 210, 220, 225 each act as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ V9000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) or network adapter 260 to the storage controller 240, such as fibre channel, FICON, ESCON, Ethernet, fiber optic, wireless, or coaxial adapters. Data storage system 200 is accordingly equipped with a suitable fabric or network adapter 260 to communicate. Data storage system 200 is depicted in FIG. 2 comprising storage controller 240 and storage 230.

Storage controller 240 is shown in FIG. 2 as a single processing unit, including a microprocessor 242, system memory 243 and non-volatile storage ("NVS") 216. It is noted that the storage controller 240 may however include multiple processing units, each with its own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230 including garbage collection. As shown in FIG. 2, system memory 243 includes an internal memory cache 245 (or alternatively is in communication with an external cache) which is a cache for the storage 230. The cache memory is used for buffering write data and read data of respective write and read requests. In one embodiment, cache 245 is allocated in a device external to system memory 243 yet remains accessible by microprocessor 242 and may serve to provide additional security against data loss.

In some embodiments, cache 245 is implemented with a volatile memory and non-volatile memory and coupled to microprocessor 242 via a local bus (not shown in FIG. 2) for enhanced performance of the data storage system 200. The NVS 216 included in the data storage controller 240 is accessible by the microprocessor 242 and serves to provide additional support for operations including garbage collection. The NVS 216 may be referred to as a persistent cache, since it may be implemented with non-volatile memory that does not need power to retain its data. The NVS 216 may be integrated with the cache 245. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

The storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200 or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes.

The storage controller 240 includes a garbage collection module 255 to assist with garbage collection in a journal file system. The garbage collection module 255 operates in conjunction with the components of the storage controller 240, the hosts 210, 220, 225, and storage devices 230. The garbage collection module 255 may be located in the cache 245 or other components of the storage controller 240.

The storage controller 240 includes a control switch 241 for controlling the fiber channel protocol to the host computers 210, 220, 225, a microprocessor 242 for controlling all the storage controller 240, a non-volatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the storage devices 230, and garbage collection module 255 in which information may be set. Multiple buffers 244 may be implemented to assist with garbage collection in the journal file system.

The host computers or one or more physical or virtual devices, 210, 220, 225 and the storage controller 240 are connected through a network adaptor (this could be a fiber channel) 260 as an interface i.e., via a switch called "fabric." The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and garbage collection module 255 are in communication with each other. Some or all of the components, such as the operation software 245, may be included with the memory 243 for performing garbage collection in the journal file system. Each of the components within the devices shown may be linked together and may be in communication with each other.

Figure 7:
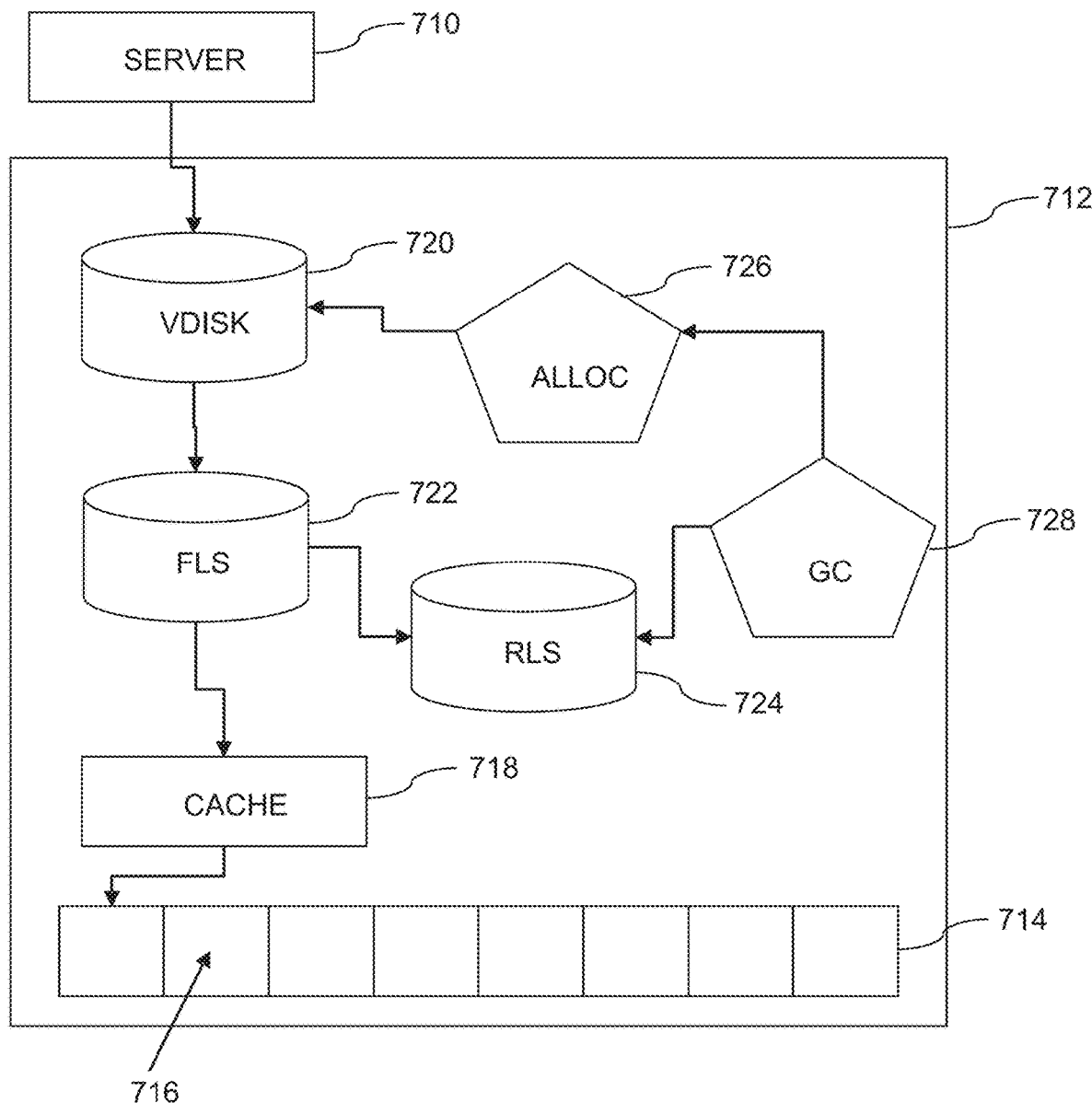
FIG. 7 is a schematic diagram of a server connected to a storage system according to an embodiment of the present disclosure.

FIG. 7 shows a server 710 connected to a storage system 712 in which the principles of the present invention may be implemented in various embodiments. The server 710 performs read and write actions with respect to the storage system 712 via an interface, for example an interface using a standard such as SCSI (the Small Computer System Interface). The storage system 712 has a number of connected physical components that provide processing and storage functions. The primary long term storage function is provided by a set of physical storage 714 (which is preferably comprised of a set of disks), which is split into logical allocation regions 716. Additional memory is also provided within the storage system 712 by a write cache 718, which is used locally by the processing components of the storage system 712.

From the point of view of the external server 710, the storage system 712 presents one or more virtual disks 720 (vdisks) that are presenting the stored data in a logical fashion to the external server 710. Data that is represented as being present on a single vdisk 720 to the server 710, may actually be stored on different disks 714 within the actual physical storage domain 714. Mapping between the vdisks 720 and the physical disks 714 is managed by two components within the storage system 712, a forward lookup structure 722 and a reverse lookup structure 724. The forward lookup structure 722 maps one or more addresses within the vdisk 720 to the actual physical location(s) within the disks 714 where the data is stored. The reverse lookup structure 24 maps the physical location(s) within the disks 714 back to the address(es) within one or more of the vdisks 720.

When a read arrives at the vdisk 720 from the server 710, the vdisk 720 communicates with the forward lookup structure 722 to obtain the physical address of the data and then reads the data required from the address within the physical domain 714. In the case of a read, no change to either of the forward lookup structure 722 or the reverse lookup structure 724 is required.

The behaviour when a write arrives at the vdisk 720 from the server 710 is more complicated. When new data is written to the disks 714, the forward lookup structure 722 must be updated to connect the address of the new data in the vdisk 720 with the physical location of the data as it is actually stored within the disks 714. In this case, both the forward lookup structure 722 and the reverse lookup structure 724 must be updated to reflect the connection between the data presented to the server 710 by the vdisk 720 and the actual physical location in the disks 714 where the data is stored.

The storage system 712 also includes two further components, a storage allocator 726 and a garbage collector 728. The storage allocator 726 performs a number of functions, primarily around allocating live blocks from live regions 716 within the physical domain 714, which are communicated to the vdisks 720, and maintaining free lists for the allocated data, this is described in more detail below. When new data is to be written within the storage system 712 the forward lookup structure 722 writes to locations determined by the allocated block location. The top-level storage allocator 726 has a set of "active" regions 716 which are tracked at any given time. A finite number of these regions 716 can be tracked. For example, in an exabyte physical domain 714, with a region size of one gigabyte (for example), this would result in tracking over one billion regions. Even if a region entry within the storage allocator 26 only cost 4 B (i.e. tracked how many blocks in the region 716 were available), this would cost 4 GB worth of memory, which is memory that is better used as cache. Therefore, a set of active regions 16 is maintained, up to N regions 16 large (where N is the maximum that can be handled by the cache 18). When all storage in an active region 716 is exhausted, this full region 716 exits the set of active regions 716, the memory used to track the region 716 can be reclaimed, and, if applicable, garbage collection performed by the garbage collector 728. When all N regions 716 are active, no further regions 716 can be allocated and this means that no free list (a list of the unallocated blocks of memory) can receive additional host blocks. The garbage collector 728 essentially reclaims regions 716 with limited live data present by rewriting the remaining live data to new regions 176, which frees these reclaimed regions 716 back to the storage allocator 726. The garbage collector 728 (or garbage collection module) connects to the reverse lookup structure 724 which is used to perform the garbage collection.

The storage system 712 is presented to the server 710 as being thin-provisioned (also known as space-efficient) where the underlying storage can be far smaller than what is present to a host (the server 710). This is achieved by a metadata structure mapping the virtual domain writes to the physical domain, and by compression and deduplication. Implementations making use of compression must implement a mechanism for space recovery, known as garbage collection, this is because there is no guarantee that any two writes to the same virtual address will make use of the same amount of physical storage. Before long, a disk 714 is left with many small areas of free-space, and it is desirable to coalesce these by moving writes in the physical domain (and updating their mapping in the virtual domain).

The role of the journal is now described. The journal keeps track of updates going into a b-tree. The b-tree stores mappings between the virtual addresses and the physical addresses. The journal's role is to keep track of changes to these mappings in case errors occur during the updates. The b-tree can then be restored with reference to the recovery information in the journal. Corruption of the mapping between the virtual and physical domains as a result of a cache contents loss or other error is thus avoided.

Within this context an overwrite operation, the steps relevant for logging in the journal are those of: writing new data to a new location; updating the b-tree to log the physical address of the new location; and marking the old physical data as invalid (stale). The garbage collection will then have to run and move any un-invalid data (i.e. still-valid data) that is intermixed with the invalid data. Typically, the valid data in a particular virtual memory block will only constitute quite a small fraction of the total, e.g. 10% or less. The garbage collection will move the still-valid data, which will most likely be cold (i.e. on main memory, physical storage and no longer in cache memory) and the act of garbage collection will cause this cold data to become hot, i.e. in flight in cache memory, and therefore at risk of loss upon a crash.

Various embodiments provide a garbage collection method for a virtualized storage system in which virtual address space is mapped to physical address space. The method may be implemented by modifying the system's storage allocator. The method can be used in storage systems that store data in compressed form, such as IBM z/OS, and also for uncompressed storage systems. The method is particularly envisaged for storage systems that always write to fresh virtual memory space in order to reduce reads and hence consume a lot of virtual memory space and require ongoing garbage collection. The storage allocator, according to various embodiments, tracks virtual memory used for writes by blocks, each block being a range of virtual memory addresses. These blocks are termed "extents."

In various embodiments, the garbage collection method proceeds as follows. The storage allocator selects an extent to receive garbage collected data, referred to as a destination or target extent.

The storage allocator selects an extent to be subject to garbage collection, referred to as a source extent, the virtual addresses of the source extent being tagged as containing either valid data or invalid data. As mentioned above, it is likely that the amount of valid data will be quite small in relation to the size of the source extent, i.e. much smaller than the amount of invalid data. In other words, each destination extent is likely to have enough space to receive all the valid data from several source extents; perhaps 5 to 10 might be typical numbers.

The storage allocator, or in some embodiments garbage collector 728 (or garbage collection module 255), moves or copies the valid data in the source extent to the destination extent via cache memory, and then repeatedly selects second, third etc. source extents to be subject to garbage collection in turn, each time moving the valid data to the destination extent via the cache memory. This proceeds until the destination extent is full. The garbage collector 728 (or garbage collection module 255) may determine when destination extent is full. When a destination extent becomes full, remaining data still to be moved or copied from the source extent that is being garbage collected can be rolled, i.e., copied into the next allocated destination extent. The whole of the source extent data from a given source extent does not need to go into one destination extent. It can be split across two; it just needs to be tagged with being dependent on the last one, as various embodiments provide for flushing in sequence, so it can be guaranteed that both destination extents will have then been flushed.

When the point is reached that the destination extent currently being used for garbage collection is full, the storage allocator or garbage collector selects another extent to become the next destination extent and thus allows continued garbage collection. The process then repeats by filling up the next destination extent with garbage collected valid data and so forth.

Asynchronously with the ongoing filling of a succession of destination extents and emptying of still-valid data out of a much larger number of source extents, each full destination extent is flushed, in turn, out of the cache. This flushing of each destination extent out of the cache memory, in the order they were allocated and filled, is initiated only after each such destination extent becomes full. The flushing and garbage collection transfers are independently controlled, so the amount of time it takes to flush each destination extent may be slower or faster in relation to the speed of the garbage collection. Because of the asynchrony between flushing and garbage collection transfer between source and destination extents, the virtual address space of the garbage-collected, source extents are not immediately made available for new writes, but rather temporarily retained. The release is first made after completion of the flushing of each destination extent, where "releasing" means making available for writes to the physical address space mapped to the virtual address space of the source extents whose valid data has been completely flushed out of the cache memory by the flushing of that particular destination extent. Therefore, although the cache flushing and subsequent release of old addresses is not performed synchronously with the garbage collection from source to destination extents, these activities are coordinated.

Figure 3A:
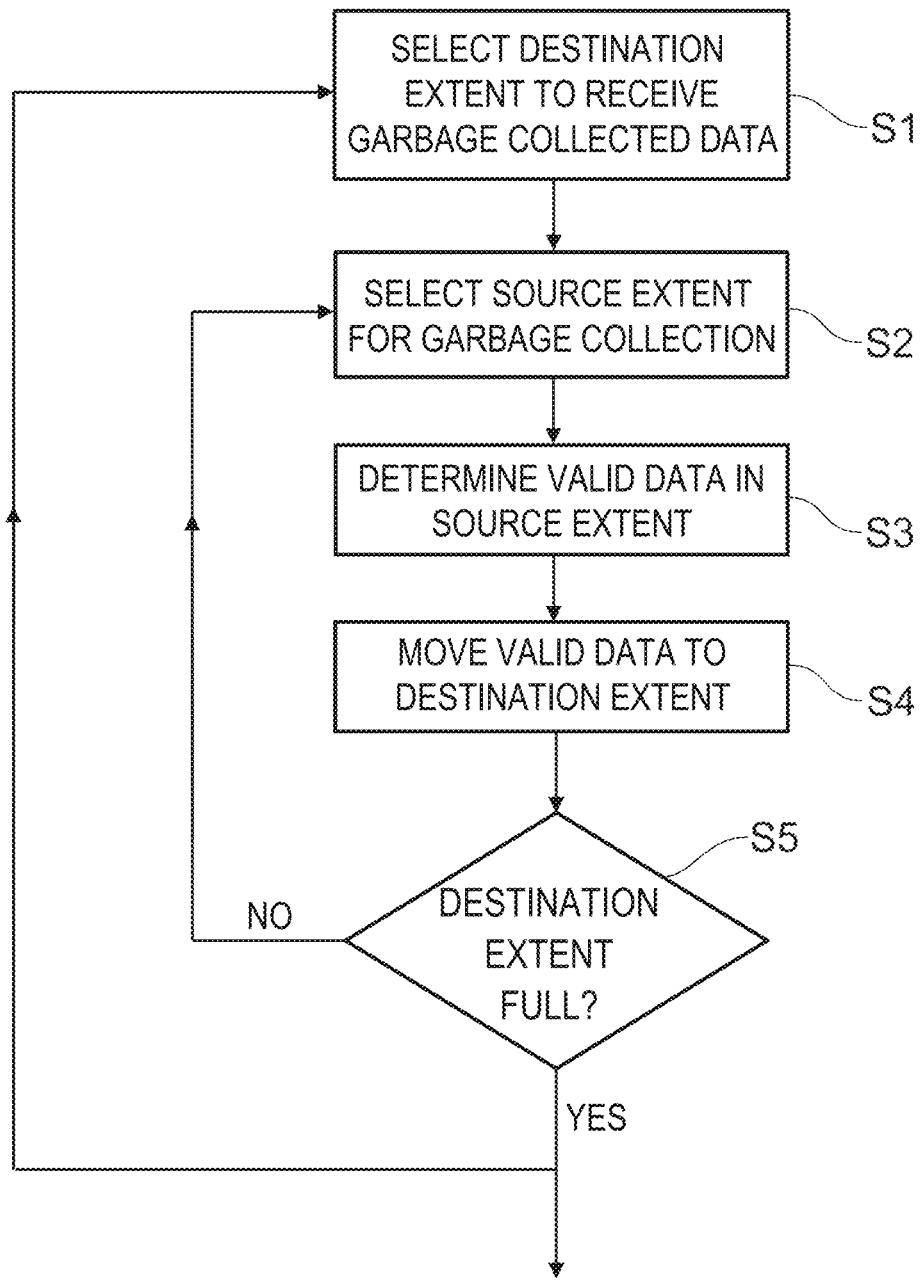
FIGS. 3A & 3B are flow diagrams showing steps in a method according to the disclosure.

FIG. 3A shows the process flow of the garbage collection activity. In Step S1, a destination extent is selected to receive garbage collected data. In Step S2, a source extent is selected for garbage collection. Steps S1 and S2 may be performed by the storage allocator. In Step S3, the valid data in the source extent is identified, and in Step S4 this valid data is moved or copied to the destination extent. Steps S4 and S5 may be performed by the storage allocator or by the garbage collector. In Step S5, if the destination extent is full (as determined by the storage allocator or by the garbage collector), then process flow returns to Step S1 to select a new destination extent for continuance of garbage collection and remaining data from the existing source extent or a new source extent will be selected in Step S2. The now-full destination extent is a candidate for cache flushing as shown in FIG. 3B.

Figure 3B:
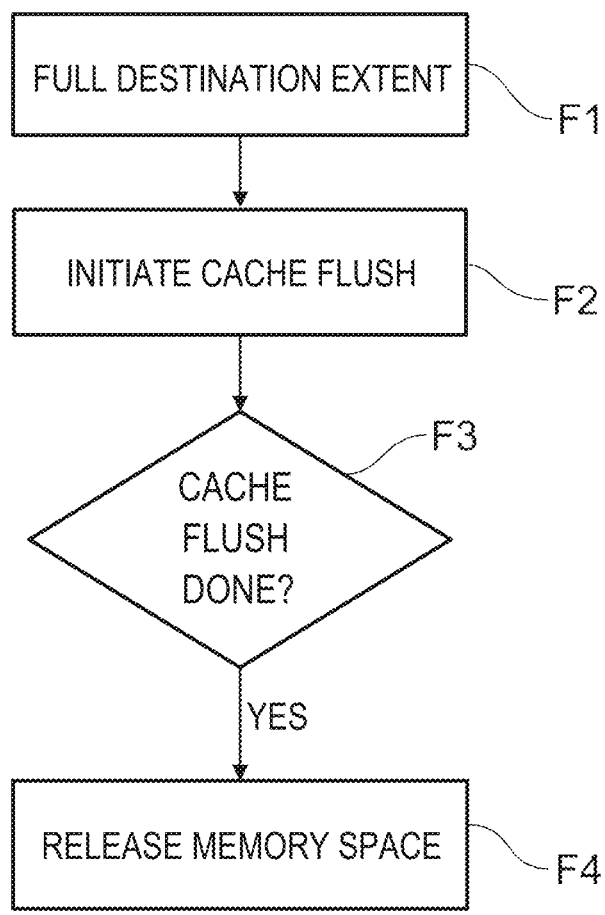

FIG. 3B shows the process flow of the cache flushing and release of extents which have been garbage collected, i.e. source extents. A full destination extent is selected for cache flushing in Step F1. A full destination extent is selected for cache flushing by the garbage collector. Cache flushing may be initiated by the garbage collector in Step F2. Once the cache flushing in complete as determined in Step F3 by the garbage collector, the memory space mapped to the source extents which have been garbage collected into the just-flushed destination extent may be released for new writes in Step F4 by the storage allocator.

In more detail, the method can be implemented so that every write to disk has a metadata header documenting what volume and forward lookup logical block address (LBA) it originally belonged to. Upon completion of all metadata updates, the reverse lookup structures, e.g. a b-tree, relating to a particular extent are updated and flushed through the cache memory to the main memory (from cache to disk). Upon completion of garbage collection, the garbage-collected extent has its reverse lookup metadata updated to document that it has been garbage collected, but the garbage-collected extent is not immediately disposed of, i.e. not immediately made available for new writes, but rather it is temporarily retained and so kept available should the cache contents be lost. The reverse lookup metadata for the garbage-collected extent is only discarded when that extent is subsequently reused or discarded.

An extent can be used by more than one implementing forward lookup structure, e.g. a b-tree, at once. Once all metadata updates have completed for an extent, a cache flush is triggered. Since a write is always written to a "new" location (either to freshly allocated storage, or to a previously garbage-collected extent), the cache is effectively only acting as a temporary buffer for full-stride writes.

The storage allocator differentiates between current extents that are being used to receive new writes inbound to the system and current extents that are being used internally to receive garbage-collected data from other extents. The storage allocator tracks the set of extents that are currently active in garbage collection through the use of a pair of sequence numbers. (In a system supporting multiple storage nodes, a separate sequence number can be used for each node.)

When garbage collection is performed on an extent, instead of allowing the old extent to be immediately reused after it has been garbage collected, this old extent is temporarily held onto, i.e. temporarily delay marking it as available as a new extent for writes. Since live data from an extent that has been garbage collected may have been assigned to be moved to multiple destination extents and tracking each of these individually is expensive, various embodiments track which extents are currently in use for writes through a pair of sequence numbers which are referred to herein to as low and high watermark sequence numbers. Use of the low and high watermark sequence numbers simplifies control of the release of physical address space after cache flushing of destination extents. The storage controller allocates a unique sequence number to each destination extent. Each sequence number allows a look-up to the source extents whose garbage collection was completed by moving data into that destination extent. The sequence number of the oldest destination extent for which flushing is not complete is stored as the low watermark sequence number. The sequence number of the destination extent currently allocated for garbage collection from source extents is stored as the high watermark sequence number. The low watermark sequence number value is incremented on completion of flushing of the oldest destination extent out of the cache memory, and the high watermark sequence number value is incremented on selecting a further destination extent for garbage collection. Since the speed of flushing is variable and may over certain periods of time be slower than the filling of destination extents, and other periods be faster, the difference between the low and high watermark values will increase and decrease over time.

Since the destination extents are flushed in order of increasing sequence number, the low watermark sequence number always corresponds to the oldest destination extent for which flushing is not complete. The range of extents having indices between the low and high watermark sequence numbers therefore indicates those destination extents (and hence the garbage-collected extents whence they have received garbage-collected data) which are potentially at risk from a cache contents loss or other cache error. Only when it is known for certain that a destination extent has been flushed to disk, is it safe to release the garbage-collected extents that are dependent on that destination extent for new writes.

The existence of the low and high watermark sequence numbers can also simplify what needs to be stored to the journal to protect against cache errors. The storage controller can restrict the recovery information stored in the journal to the memory addresses linked to that associated with sequence numbers between the low and high watermark values. The recovery information for each such sequence number includes a mapping to the source extents whose garbage collection was completed by moving data into the destination extent associated with that sequence number. In the event of cache contents loss during garbage collection, the recovery information is used to rebuild a forward lookup metadata structure that links virtual address space to physical address space for the source extents identified in the recovery information. Namely, the journal may attempt to recover the forward lookup structures through a replay approach. This replay approach will read a journal entry, which indicates a physical address of a destination extent, and then read the destination extent in the physical domain to determine whether or not the location the journal entry is referring to has the correct metadata header belonging to the volume that it is being attempted to recover. If a mismatch is found between the journal and the data domain, the journal replay continues to later journal entries, and the address being recovered is left as a medium error; subject to a later journal entry finding more valid data. This replay approach attempts to find the last reference which has not been overwritten. Additional details of this replay approach are disclosed in co-owned, co-pending U.S. patent application Ser. No. 16/548,474 filed on Aug. 22, 2019 and entitled "Data Validation During Data Recovery in a Log-Structured Array Storage System," which is incorporated herein by reference in its entirety. When it is identified that references to a garbage-collected extent have been recovered, it is necessary to treat the extent in question as if the garbage collection had not been successful, and therefore as requiring a second round of garbage collection. Because the reverse lookup metadata may have marked the recovered references as invalidated, it is necessary to mark the extent as subject to garbage collection without the use of the reverse lookup structure. This is achievable by utilizing the header data associated with each write. Garbage collection will inject all volume-writes it is able to identify on the data disk from the header into the IO path. The IO path will reject writes originally coming from locations which do not match the forward lookup structure. This is done for garbage collection using the reverse lookup structure, and garbage collection without the reverse lookup structure, as it removes the requirement for the reverse lookup structure to be perfectly consistent with the forward lookup structure. Because we have identified and prevented the reuse, prior to completed flushing, of extents belonging to garbage collected extents, this replay approach will always find data belonging to garbage collected extents in the event of a cache loss.

It is a consequence of the proposed method that it will consume more memory space than a conventional method, since it holds onto extents for longer than an approach which immediately reuses extents which have been garbage collected. It is therefore possible that use of the proposed method will lead to shortage of the virtual memory space, bearing in mind that a particular user, enterprise entity or application will typically only be allocated a fixed amount of virtual memory space. In particular, if flushing has become slow for whatever reason, the difference between the low and high watermark values can become high, meaning that a large amount of memory space may be tied up in the garbage collection. Consequently, if the amount of free virtual memory reduces to below a certain threshold, e.g. 10% or 5% of the total available virtual memory, it may be beneficial to halt the garbage collection activity according to the proposed method which will allow the virtual memory space allocated to garbage-collection destination extents for those destination extents for which the source extents have not yet been released to be released as available for new writes. If the available virtual address space is determined to have become scarce, the storage allocator suspends garbage collection, by suspending the moving of valid data from source to destination extents. It can then release as available for writes the physical address space mapped to the virtual address space of the destination extents with sequence numbers between the low and high watermark values. This release may in practice not be instantaneous, since it will involve first notifying all parts of the storage allocator to stop using these destination extents. Once all storage associated with these destination extents has reported as having completed use, or having been discarded, these destination extents can be released for new writes. Another option for dealing with the same issue is to cap the difference between the low and high watermark values, so there is a maximum number of destination extents that can be tied up with garbage collection. When the cap is hit, this will stall garbage collection until the low watermark sequence number is incremented, i.e. until the current cache flush is completed.

Figures 4A, 4B, 4C, 4D:
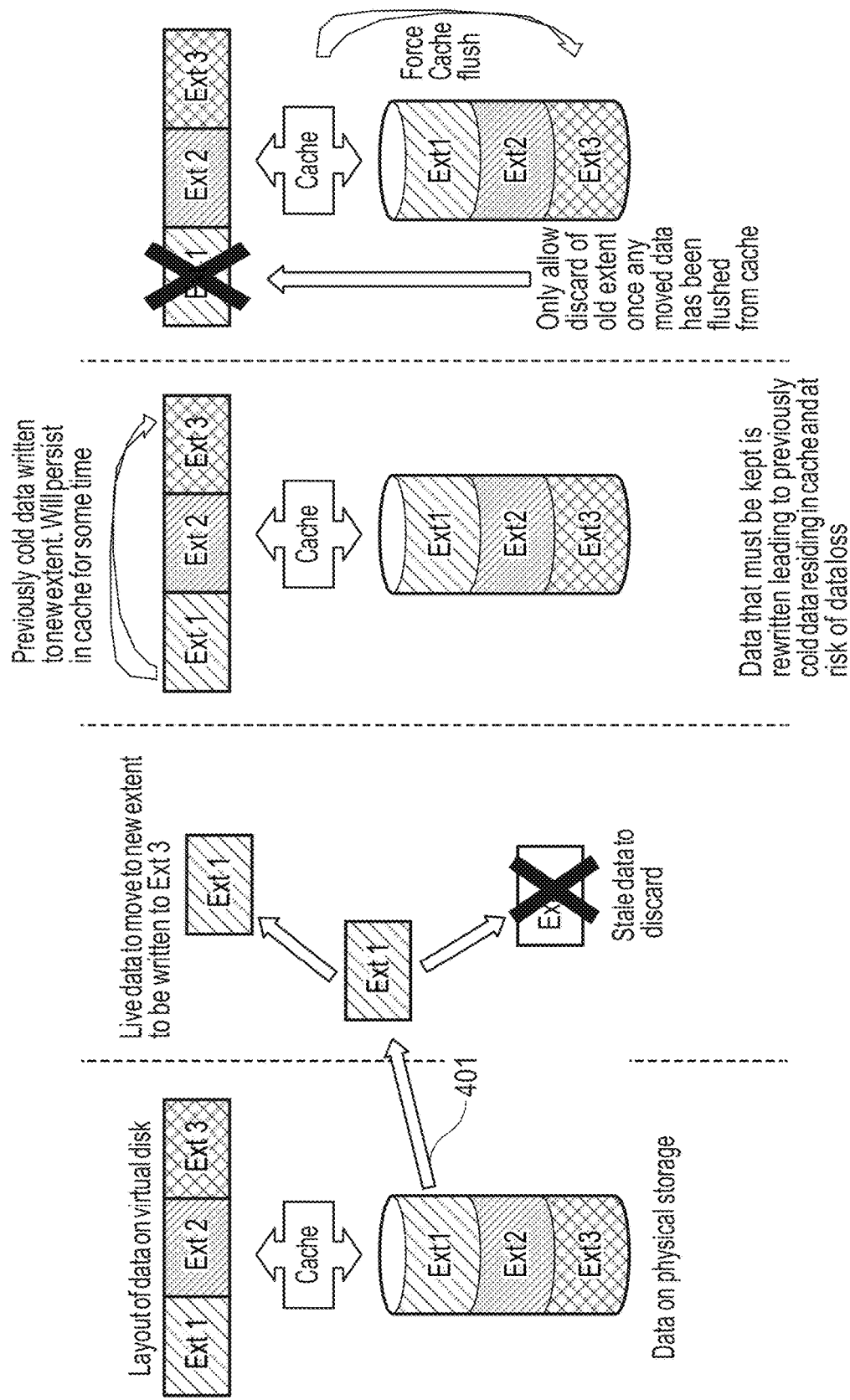
FIGS. 4A to 4D are schematic block diagrams showing an example progression of garbage collection according to a method according to the disclosure.

FIGS. 4A to 4D are schematic block diagrams showing an example progression of garbage collection according to the proposed method. A time sequence is schematically illustrated from FIG. 4A to 4D. Initially, the virtual memory is using three example extents: Ext1, Ext2, Ext3 with transfers to physical storage taking place via a cache. Extent1 (Ext1) contains a mixture of cold data and stale (still-valid) data to be garbage collected. Extent2 (Ext2) contains cold static data. Extent3 (Ext3) is the extent currently being used for new writes. Extent1 is then identified as a candidate for garbage collection on the basis of its relatively small proportion of still-valid data. The garbage collection process reads an extent and selects data to be kept (401). As shown schematically in FIG. 4B, the stale data from Extent1 is identified to be discarded and the still-valid 'live' data from Extent1 is written to Extent3. FIG. 4C shows that even after completion of garbage collection from Extent1 to Extent3, the data is retained in Extent1 while the garbage collected data is potentially still in transit to the physical storage via the cache. FIG. 4D then shows how Extent1 can be discarded once the cache has been flushed to the physical storage in respect of Extent3.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
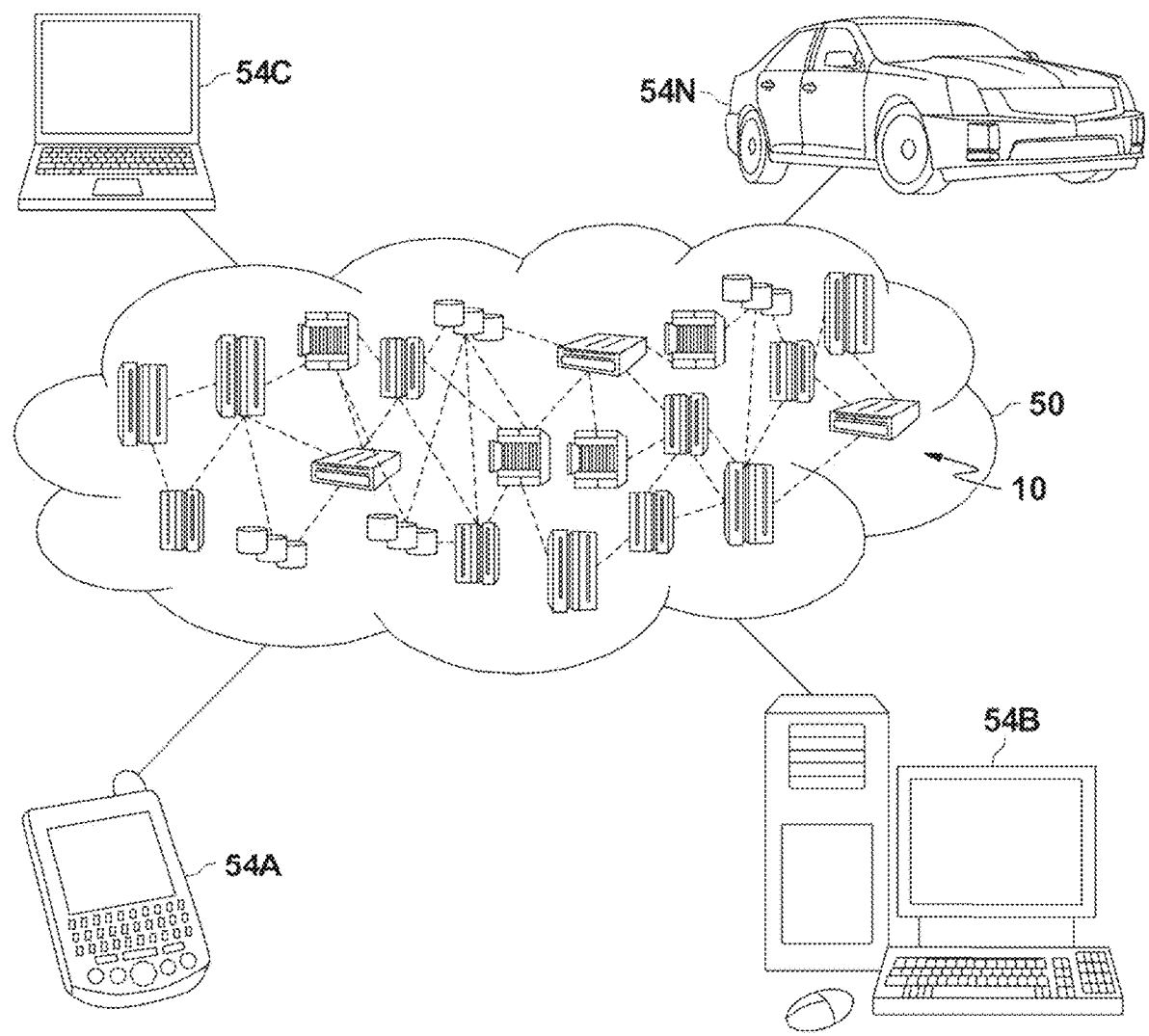
FIG. 5 depicts a cloud computing environment according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

An add-on according to embodiments of the disclosure may be installed in a web browser in the environment of FIG. 5 as follows. One of the cloud computing nodes 10 may host a website from which the add-on may on request be downloaded to a third-party computing device such as any of the computing devices 54A, 54B and 54C. The request causes the add-on to be sent from the node 10 via a network connection to the computing device 54A/54B/54C, where the add-on is sent together with an installer for integrating the add-on with a web browser already present on the computing device.

Figure 6:
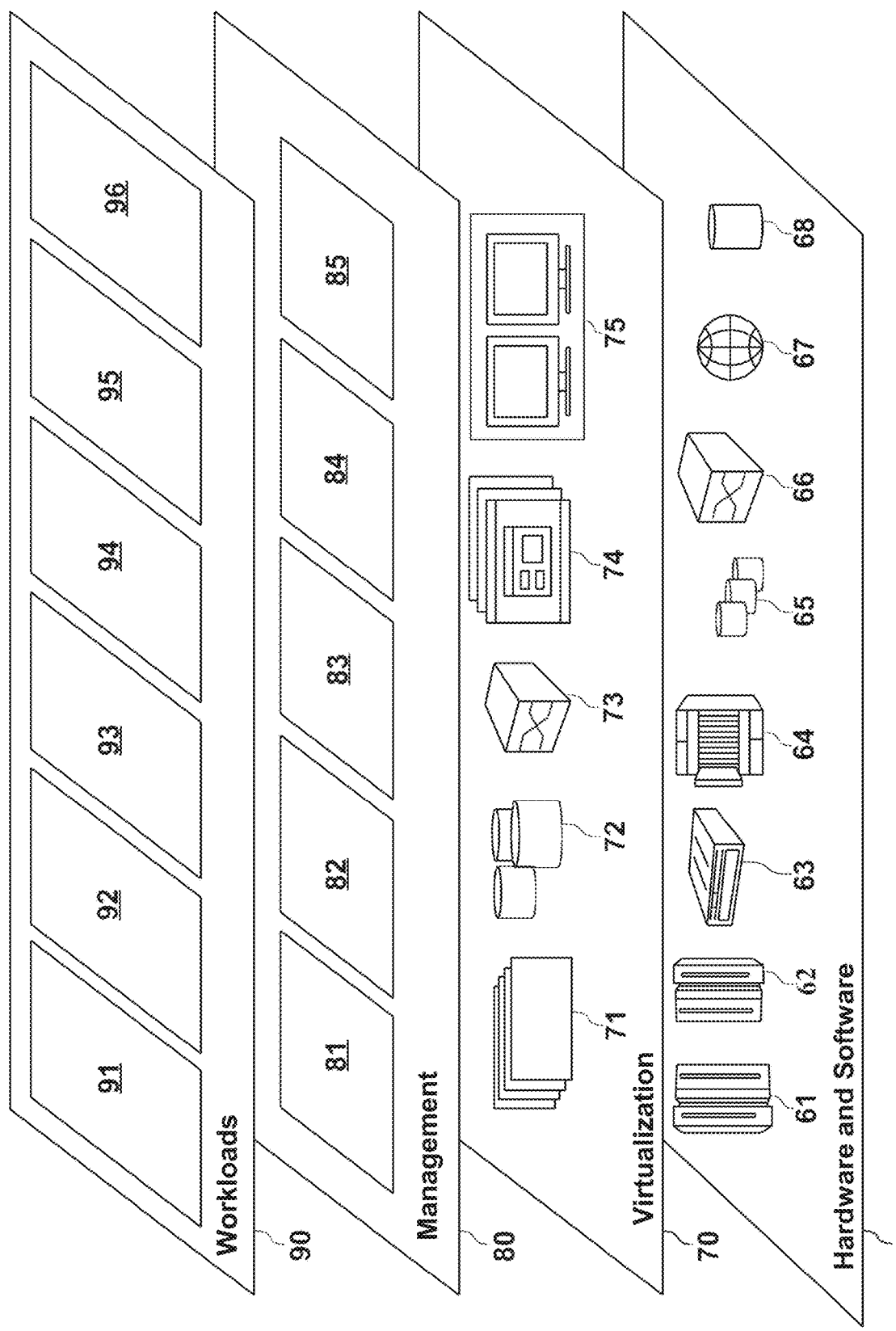
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and a storage allocator 96 with garbage collection management as described above according to embodiments of the disclosure.

It will be clear to one skilled in the art that many improvements and modifications can be made to the foregoing exemplary embodiment without departing from the scope of the present disclosure.

What is claimed is:

1. A method of garbage collection in a storage system in which a virtual address space is mapped to a physical address space, the virtual address space being addressed in extents and the storage system having one or more processors, a plurality of storage devices, and a cache memory, the method comprising:
   determining whether a current destination extent for receiving garbage collected data is full, wherein the garbage collected data includes valid data that was copied to the current destination extent from a current source extent subject to garbage collection via the cache memory;
   determining whether a current source extent subject to garbage collection contains one or more portions of valid data not copied to a destination extent;
   responsive to determining that the current destination extent for receiving garbage collected data is full, flushing the valid data copied to the current destination extent via the cache memory out of the cache memory; and
   releasing, as available for writes, the physical address space mapped to the virtual address space of one or more source extents having all valid data stored therein copied to the current destination extent via the cache memory.

2. The method of claim 1, further comprising:
   responsive to determining that the current destination extent for receiving garbage collected data is not full and determining that the current source extent subject to garbage collection contains one or more portions of valid data not copied to a destination extent, copying one of the portions of valid data not copied to a destination extent from the current source extent to the current destination extent via the cache memory.

3. The method of claim 1, further comprising:
   responsive to determining that the current destination extent for receiving garbage collected data is full, selecting a second destination extent as the current destination extent for receiving garbage collected data,
   determining whether the second destination extent for receiving garbage collected data is full, and
   responsive to determining that the second destination extent for receiving garbage collected data is full, flushing the valid data copied to the current destination extent via the cache memory out of the cache memory,
   wherein the flushing of valid data copied to a current destination extent via the cache memory out of the cache memory is flushed in a same order as an order in which the destination extents were determined to be full.

4. The method of claim 1, responsive to determining that the current source extent subject to garbage collection contains no portions of valid data not copied to a destination extent, selecting a second source extent as the current source extent to be subject to garbage collection.

5. The method of claim 1, further comprising:
   controlling the release of physical address space after cache flushing of destination extents with the aid of allocating a sequence number to each destination extent, each sequence number allowing a look-up to the source extents whose garbage collection was completed by copying data into that destination extent,
   the sequence number of the oldest destination extent for which flushing has not been performed being stored as a low watermark sequence number, and
   the sequence number of the current destination extent allocated for garbage collection from source extents being stored as a high watermark sequence number, wherein the low watermark sequence number is incremented on completion of flushing of the oldest destination extent out of the cache memory, and the high watermark sequence number is incremented on selecting a further destination extent for garbage collection.

6. The method of claim 5, wherein, in response to determining that the available virtual address space is less than a threshold:

suspending the copying of valid data from source to destination extents; and releasing as available for writes to the physical address space mapped to the virtual address space of at least one destination extent having a sequence number between the low and high watermark values.

7. The method of claim 5, further comprising:

maintaining a journal that stores recovery information for destination extents having a sequence number between the low and high watermark values, the recovery information including mappings between source extents whose valid data was subject to garbage collection and corresponding destination extents.

8. The method of claim 7, further comprising:

responsive to determining a loss of cache contents during garbage collection, using the recovery information to rebuild a forward lookup metadata structure that links virtual address space to physical address space for the source extents identified in the recovery information.

9. A computer program product for garbage collection in a storage system in which a virtual address space is mapped to a physical address space, the virtual address space being addressed in extents and the storage system having one or more processors, a plurality of storage devices, and a cache memory, the computer program product comprising a computer readable storage medium having program instructions embodied therewith, the program instructions executable by a processor to cause the processor to:

determine whether a current destination extent for receiving garbage collected data is full, wherein the garbage collected data includes valid data that was copied to the current destination extent from a current source extent subject to garbage collection via the cache memory;

determine whether the current source extent subject to garbage collection contains one or more portions of valid data not copied to a destination extent;

responsive to determining that the current destination extent for receiving garbage collected data is full, flush the valid data copied to the current destination extent via the cache memory out of the cache memory; and release, as available for writes, the physical address space mapped to the virtual address space of one or more source extents having all valid data stored therein copied to the current destination extent via the cache memory.

10. The computer program product of claim 9, further comprising:

responsive to determining that the current destination extent for receiving garbage collected data is not full and determining that the current source extent subject to garbage collection contains one or more portions of valid data not copied to a destination extent, copy one of the portions of valid data not copied to a destination extent from the current source extent to the current destination extent via the cache memory.

11. The computer program product of claim 9, further comprising:

responsive to determining that the current destination extent for receiving garbage collected data is full, select a second destination extent as the current destination extent for receiving garbage collected data, determining whether the second destination extent for receiving garbage collected data is full, and responsive to determining that the second destination extent for receiving garbage collected data is full, flush the valid data copied to the current destination extent via the cache memory out of the cache memory, wherein the flushing of valid data copied to a current destination extent via the cache memory out of the cache memory is flushed in a same order as an order in which the destination extents were determined to be full.

12. The computer program product of claim 9, responsive to determining that the current source extent subject to garbage collection contains no portions of valid data not copied to a destination extent, select a second source extent as the current source extent to be subject to garbage collection.

13. The computer program product of claim 9, further comprising:

control the release of physical address space after cache flushing of destination extents with the aid of allocating a sequence number to each destination extent, each sequence number allowing a look-up to the source extents whose garbage collection was completed by copying data into that destination extent, the sequence number of the oldest destination extent for which flushing has not been performed being stored as a low watermark sequence number, and the sequence number of the current destination extent allocated for garbage collection from source extents being stored as a high watermark sequence number, wherein the low watermark sequence number is incremented on completion of flushing of the oldest destination extent out of the cache memory, and the high watermark sequence number is incremented on selecting a further destination extent for garbage collection.

14. The computer program product of claim 13, wherein, in response to determining that the available virtual address space is less than a threshold:

suspend the copying of valid data from source to destination extents; and release as available for writes to the physical address space mapped to the virtual address space of at least one destination extent having a sequence number between the low and high watermark values.

15. The computer program product of claim 13, further comprising:

maintain a journal that stores recovery information for destination extents having a sequence number between the low and high watermark values, the recovery information including mappings between source extents whose valid data was subject to garbage collection and corresponding destination extents.

16. The computer program product of claim 9, further comprising:

responsive to determining a loss of cache contents during garbage collection, rebuild a forward lookup metadata structure, using the recovery information, that links virtual address space to physical address space for the source extents identified in the recovery information.

17. A storage system having a virtual address space that is mapped to a physical address space, the virtual address space being addressed in extents, the storage system having one or more processors, a plurality of storage devices, and a cache memory, the storage system comprising:
- a garbage collector to determine whether a destination extent selected as the current destination extent for receiving garbage collected data is full, wherein the garbage collected data includes valid data that was copied to the current destination extent from a current source extent subject to garbage collection via the cache memory;
- the garbage collector to determine whether a the current source extent subject to garbage collection contains one or more portions of valid data not copied to a destination extent;
- responsive to determining that the current destination extent for receiving garbage collected data is full, the garbage collector to flush the valid data copied to the current destination extent via the cache memory out of the cache memory; and
- a storage allocator to release, as available for writes, the physical address space mapped to the virtual address space of one or more source extents having all valid data stored therein copied to the current destination extent via the cache memory.

18. The storage system of claim 17, further comprising:
responsive to determining that the current destination extent for receiving garbage collected data is not full and determining that the current source extent subject to garbage collection contains one or more portions of valid data not copied to a destination extent, copying one of the portions of valid data not copied to a destination extent from the current source extent to the current destination extent via the cache memory.

19. The storage system of claim 17, further comprising:
responsive to determining that the current destination extent for receiving garbage collected data is full, selecting a second destination extent as the current destination extent for receiving garbage collected data,
determining whether the second destination extent for receiving garbage collected data is full, and
responsive to determining that the second destination extent for receiving garbage collected data is full, the garbage collector to flush the valid data copied to the current destination extent via the cache memory out of the cache memory,
wherein the flushing of valid data copied to a current destination extent via the cache memory out of the cache memory is flushed in a same order as an order in which the destination extents were determined to be full.

20. The storage system of claim 17, responsive to determining that the current source extent subject to garbage collection contains no portions of valid data not copied to a destination extent, the storage allocator to select a second source extent as the current source extent to be subject to garbage collection.

21. The storage system of claim 17, further comprising:
the storage allocator to control the release of physical address space after cache flushing of destination extents with the aid of allocating a sequence number to each destination extent, each sequence number allowing a look-up to the source extents whose garbage collection was completed by copying data into that destination extent,
the sequence number of the oldest destination extent for which flushing has not been performed being stored as a low watermark sequence number, and
the sequence number of the current destination extent allocated for garbage collection from source extents being stored as a high watermark sequence number, wherein
the low watermark sequence number is incremented on completion of flushing of the oldest destination extent out of the cache memory, and
the high watermark sequence number is incremented on selecting a further destination extent for garbage collection.

22. The storage system of claim 21, wherein, in response to determining that the available virtual address space is less than a threshold:
the storage allocator to suspend the copying of valid data from source to destination extents; and
the storage allocator to release as available for writes to the physical address space mapped to the virtual address space of at least one destination extent having a sequence number between the low and high watermark values.

23. The storage system of claim 21, further comprising:
the garbage collector to maintain a journal that stores recovery information for destination extents having a sequence number between the low and high watermark values, the recovery information including mappings between source extents whose valid data was subject to garbage collection and corresponding destination extents.

24. The storage system of claim 23, further comprising:
responsive to determining a loss of cache contents during garbage collection, the garbage collector to use the recovery information to rebuild a forward lookup metadata structure that links virtual address space to physical address space for the source extents identified in the recovery information.

* * * * *